Feb. 28, 1956 C. W. MACKEY 2,736,577
SINK WASTE FITTING
Filed May 2, 1951

INVENTOR.
Charles W. Mackey
BY
H. F. Johnston
Attorney

United States Patent Office 2,736,577
Patented Feb. 28, 1956

2,736,577

SINK WASTE FITTING

Charles W. Mackey, Waterbury, Conn., assignor to Scovill Manufacturing Company, Waterbury, Conn., a corporation of Connecticut Application May 2, 1951, Serial No. 224,125

1 Claim. (Cl. 285—45)

This invention relates to waste fittings or the like and particularly to that type of fitting used in sinks and having associated therewith a crumcup strainer and stopper.

One of the objects of this invention is to provide a waste fitting of light weight construction, and having a simplified means for attaching it to the usual drain opening in a sink. Heretofore the body part of the waste fitting housing has been made of cast material or from a forging to provide sufficient stock for threading purposes so that the usual large attaching nuts could be connected thereto in making the coupling connection of the drain pipe to the housing and also in making the assembly connection of the housing to the sink outlet. It has always been difficult to thread the large assembly nut on the housing particularly in view of the cramped quarters in which the strainer housing is usually located and requiring a special form of wrench in order to manipulate the nut.

In my invention the fitting can be drawn up from sheet metal stock and the large nut for assembling the housing to the sink is eliminated and in place thereof a light weight metal assembly ring of particular construction is employed that can be quickly attached to the outside of the housing by snap engagement. With this construction only small screws are required for tightening up the housing around the sink drain opening in the usual manner.

Various other objects and advantages of the invention will become apparent from a reading of the following description.

Figure 1:
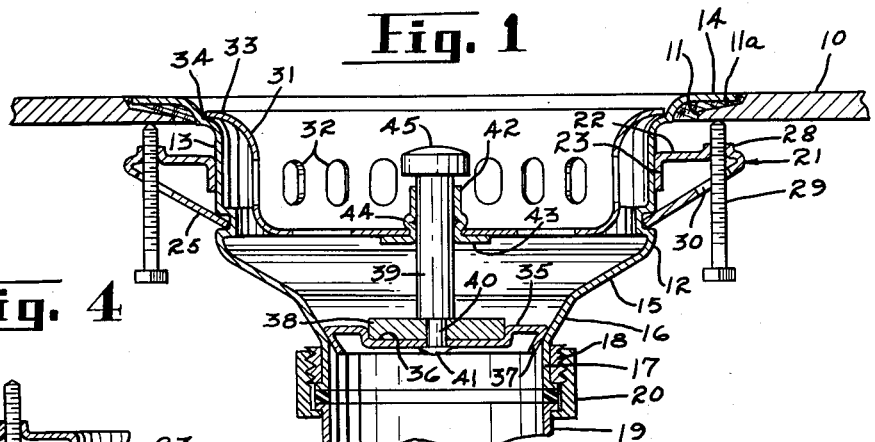
Fig. 1 is a vertical sectional view through my improved waste fitting.
Figure 4:
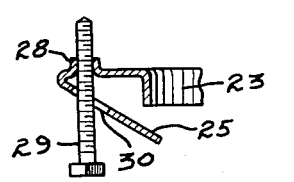
Fig. 4 is a section through one of the lug portions of the ring, the view taken along the line 4—4 of Fig. 2.
Figure 2:
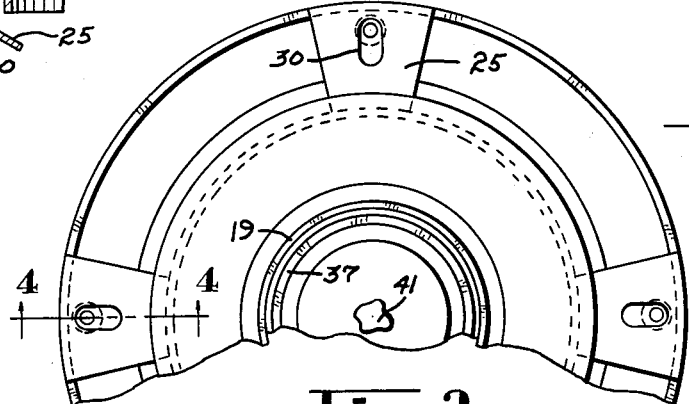
Fig. 2 is a fragmentary plan view of the waste fitting as it appears from the underside.
Figure 3:
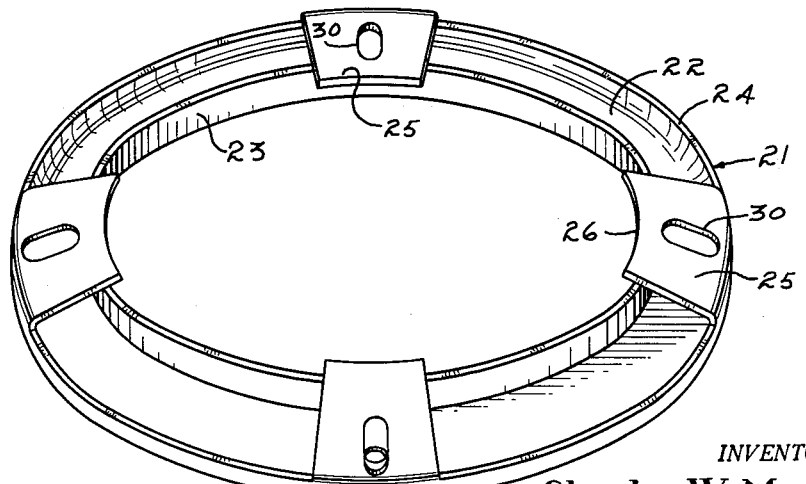
Fig. 3 is a perspective view of the light weight metal assembly rings.

Referring now to the drawing in which like references denote like parts in the several views, the numeral 10 refers to a small portion of a sink having a drain opening 11 surrounded by a beveled surface 11a. Into this opening is fitted a drain housing 12 having a cylindrical wall portion 13 and an outwardly extending flange 14 at its upper end that is adapted to overlie the beveled surface 11a with sealing material such as rubber or putty therebetween. The base of the housing 12 is formed with a gradually tapering section 15 and a more abruptly tapering section 16 that terminates in a cylindrical wall extension 17. A threaded collar 18 is permanently secured to the outside of the outlet wall 17 and to this collar the usual drain tubing 19 may be attached by a conventional coupling nut 20.

In order to readily connect the drain housing to the sink 10, there is provided a specially constructed assembly snap member 21 consisting of an annular ring 22 having a depending neck rim 23 integrally with its inner periphery and which neck rim 23 is adapted to have a slip fit engagement about the cylindrical wall 13 of the housing 12. The outer periphery of the ring 22 is preferably provided with a rounding flange portion 24 to give added strength to the ring 22. Extending downwardly and biased inwardly from the outer periphery of the flange portion 24 is a series of equally spaced spring lugs 25 having inwardly arcuate tip ends 26.

In making the assembly of the assembly member 21 to the housing 12 the neck rim 23 will be slipped over the cylindrical wall portion 13 from the underside of said housing whereupon the lugs 25 will cam over the gradual tapering portion 15 and about the cylindrical wall portion to a position where the tip ends 26 of said lugs 25 will snap lock into an annular recess 27 formed inwardly adjacent the lower end of said cylindrical wall portion 13.

The annular ring 22 in line with the spring lugs 25 is provided with a like number of drifted necks 28 which may be tapped for receiving threaded attaching screws 29. The lugs 25 are provided with elongated openings 30 in line with the necks 28 through which the screws loosely pass without interfering with the flexibleness of the lugs 25. When the assembly member 21 has been assembled in position as above described it is only necessary to tighten the screws 29 which will then engage on the underside of the sink and draw the flange 14 against the beveled surface 11a surrounding the opening 11 or against any sealing washer or material that may be interposed therebetween. When axial pressure is applied to said ring coincident with the tightening of the screws 29 against the sink 10, the lugs 25 will act as braces to retain the ring 22 in position on the housing wall portion 13.

In making provision for a strainer and a stopper for the drain housing a cupped-shape strainer or basket 31 is provided having the usual outlets 32 in its wall and base portions.

The upper end of the strainer 31 is formed with an outward rounded flange 33 that is adapted to seat into an inwardly formed annular recess 34 provided in the drain housing between the cylindrical wall portion 13 and the flange 11.

A special stopper member 35, preferably made of thin sheet metal material such as brass, has a central depression 36 and a peripheral inwardly beveled flange 37. The beveled flange 37 is designed to seat against the more abruptly tapered base 16 of the housing 12 to effect the usual seal for the sink. A cylindrical shaped magnet 38 is seated within the depression 36 and permanently held in place by a lift stem 39 that has a reduced section 40 passing through a suitable hole in the magnet and riveted over against the underside of the stopper 35 as at 41. The stem 39 is telescopically fitted within a stopper guide 42 that is permanently secured to the basket as by a flange 43 seated against the underside of the base of the strainer 31 and an outwardly collapsed rib 44 compressed against the opposite side of the strainer base. The upper end of the stem is provided with the usual enlarged head 45 for manipulating the stopper 35 and also serving to retain the stopper with the crumcup basket or retainer 31 as a unit.

The stopper guide 42 is preferably made of stainless steel and the flange 43 is of sufficient size to assure that the magnet when disposed thereagainst will serve to maintain the stopper in elevated position against the flow force of the water passing down through the waste tending to disconnect the stopper from the crumcup basket.

While it is preferable to make the crumcup basket 31 of brass and the stem guide 42 of stainless steel, it is within the purview of the invention to make the basket and the guide entirely of stainless steel as a single unit. It is also considered that it is possible to incorporate the magnetic element 38 into the base of the crumcup strainer 31 and make the stopper member 35 of stainless steel and operate with the same degree of practicalness as the illustrated form described.

While the foregoing description sets forth the invention in specific terms, it is to be understood that changes in shape, size and the material may be resorted to without departing from the spirit and scope of the invention as claimed hereinafter.

I claim:

In a waste-outlet fitting adapted to be secured within a drain aperture of a sink and comprising a body shell having an outward radial flange at its upper end and an inward tapering base portion at the opposite end terminating in a cylindrical wall, means for connecting a waste pipe to said cylindrical wall, an assembly ring having a slip fit on said shell, said shell having a circumferential recess, spring bracing means carried by said ring and having snap-locking engagement in said recess, and screw means threadedly fitted in said ring in circumferential alignment with said bracing means and engageable with said sink to secure said fitting within said drain aperture.

References Cited in the file of this patent

UNITED STATES PATENTS

| | | |
|---|---|---|
| 1,318,082 | Jaeoby | Oct. 7, 1919 |
| 1,453,471 | Tarte | May 1, 1923 |
| 1,538,433 | Hirshstein | May 9, 1925 |
| 2,090,299 | Kuhnle | Aug. 17, 1937 |
| 2,225,693 | Frances | Mar. 8, 1938 |
| 2,263,537 | Fredrickson | Nov. 18, 1941 |
| 2,278,566 | Schaible | Apr. 7, 1942 |
| 2,528,919 | Stone et al. | Nov. 7, 1950 |
| 2,584,860 | Galley | Feb. 5, 1952 |